United States Patent [19]

Godard

[11] Patent Number: 4,481,646
[45] Date of Patent: Nov. 6, 1984

[54] METHOD AND APPARATUS FOR RECEIVING A DATA SIGNAL MODULATED BY MEANS OF A DOUBLE SIDEBAND-QUADRATURE CARRIER MODULATION TECHNIQUE

[75] Inventor: Dominique Godard, LeRouret, France

[73] Assignee: International Business Machines Corp., Armonk, N.Y.

[21] Appl. No.: 442,983

[22] Filed: Nov. 19, 1982

[30] Foreign Application Priority Data

Nov. 30, 1981 [EP] European Pat. Off. ........ 81430041.4

[51] Int. Cl.³ .............................................. H03D 1/24
[52] U.S. Cl. ........................................ 375/77; 329/50
[58] Field of Search ...................... 375/77, 82; 329/50, 329/104, 105, 145; 364/701, 702, 724; 307/520, 521

[56] References Cited

U.S. PATENT DOCUMENTS

| | | | |
|---|---|---|---|
| 3,670,269 | 6/1972 | Starr et al. | 333/18 |
| 4,087,757 | 5/1978 | Cunningham | 307/520 |
| 4,130,806 | 12/1978 | Gerwen et al. | 329/50 |
| 4,247,940 | 1/1981 | Mueller et al. | 375/14 |
| 4,262,360 | 4/1981 | Bigo et al. | 375/77 |
| 4,272,845 | 6/1981 | Fiumani | 375/77 |
| 4,408,332 | 10/1983 | Sari | 329/50 |

FOREIGN PATENT DOCUMENTS 0030037  10/1981  European Pat. Off. .

Primary Examiner—Benedict V. Safourek
Attorney, Agent, or Firm—John B. Frisone

[57] ABSTRACT

A method and apparatus for receiving a data signal modulated by means of a double sideband-quadrature carrier modulation technique in which the received signal is sampled at a rate higher than the signaling rate 1/T, passed through a compensating filter, and applied to a processing system which provides the detected data. The compensating filter is such that the amplitudes of the components at $f_1 = f_c - 1/2T$ and $f_2 = f_c + 1/2T$, where $f_c$ is the carrier, are equal. An initializer enables a filter coefficient to be determined during the turn-on time of the receiver. An adjusting device allows this coefficient to be continually adjusted. The invention can be used in data transmission systems whose channel has an asymmetric amplitude-frequency response curve.

19 Claims, 5 Drawing Figures

METHOD AND APPARATUS FOR RECEIVING A DATA SIGNAL MODULATED BY MEANS OF A DOUBLE SIDEBAND-QUADRATURE CARRIER MODULATION TECHNIQUE

DESCRIPTION

1. Technical Field

This invention relates to data transmission systems and, more particularly, to a method and apparatus for receiving a data signal modulated by means of a double sideband-quadrature carrier (DSB-QC) modulation technique, which are particularly suitable for use in systems wherein the amplitude-frequency response curve of the transmission channel is not symmetrical. The term DSB-QC modulation is used here in a broad sense to include all modulation techniques wherein the transmitted signal can be represented by superimposing two amplitude-modulated quadrature carriers.

2. Background Art

In data transmission systems which use a DSB-QC modulation technique, the sequence of bits to be transmitted is first arranged into groups of q bits each and each group is made to correspond to one of $2^q$ complex numbers, or complex symbols. The symbols are then transmitted one at a time at instants which have a regular T-second spacing and are called signaling instants. Each symbol is transmitted by causing an amplitude value of each of two quadrature carriers which have the same frequency to correspond, respectively, to its real and imaginary parts. These two carriers are then combined and applied to the input of the transmission channel.

In conventional DSB-QC receivers, the signal received from the transmission channel is passed through a band-pass filter which rejects the out-of-band noise, and its energy is normalized by an AGC circuit. The resultant signal is digitalized and subsequently processed to obtain the detected data. The processing usually involves recovering the in-phase and quadrature components of the digitalized signal, demodulating same by means of a local carrier, equalizing the demodulated signal and deriving the data therefrom. The various components of the receiver are controlled by a clock synchronized with the received signal. An embodiment of such a receiver is described, for example, in U.S. Pat. No. 4,227,152.

In data transmission systems that use DSB-QC modulation, the frequency spectrum of the data signal inputted to the transmission channel (termed transmitted signal hereafter) is centered on frequency $f_c$ of the carrier and, given an attenuation of 3 dB, has a width equal to the signaling rate 1/T. The frequencies $f_1$ and $f_2$ which delimit this width and are usually termed Nyquist frequencies are defined as:

$$f_1 = f_c - \frac{1}{2T} \quad f_2 = f_c + \frac{1}{2T}$$

Figure 1:
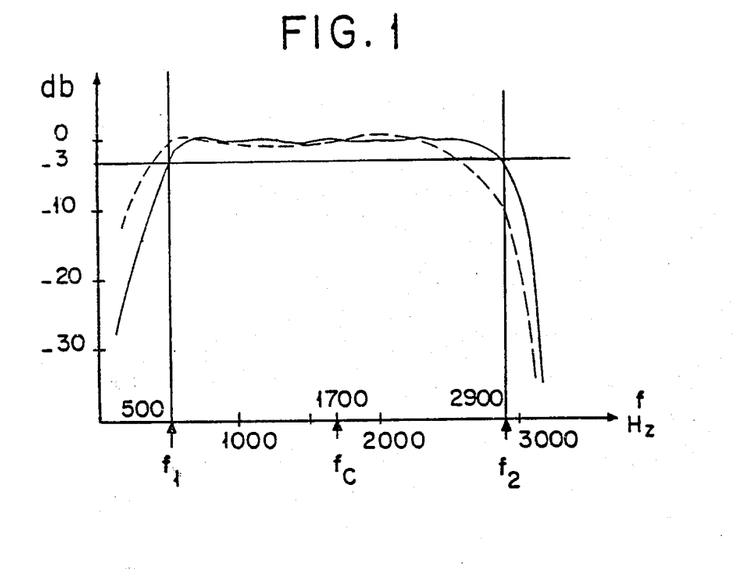
FIG. 1 shows typical spectra of a DSB-QC data signal transmitted over a transmission channel, and of the signal received at the output thereof.

By way of example, a typical spectrum of a signal transmitted at 9600 bits per second (bps) in a system in accordance with CCITT Recommendation V29 is shown in solid lines in FIG. 1. In this example, the following values are used:

| $f_c$ = 1700 Hz | 1/T = 2400 Hz |
| --- | --- |
| $f_1$ = 500 Hz | $f_2$ = 2900 Hz. |

If an ideal transmission channel were used, the spectrum of the signal obtained at the output of the channel termed received signal hereafter) would be identical to the transmitted signal. This is not the case with actual transmission channels, most of which, particularly those which are switched public network telephone lines, have an amplitude-frequency response curve that is not symmetrical with respect to its center frequency, so that the edges of the received signal spectrum are asymmetrical. The dotted line in FIG. 1 shows a typical received signal spectrum corresponding to the transmitted signal spectrum shown in solid lines. The asymmetry of the received signal spectrum adversely affects the operation of the receiver and, in particular, the synchronization of its clock, which is usually synchronized with the received signal by means of timing information derived from the components at $f_1$ and $f_2$ of the received signal, as described in U.S. Pat. No. 4,039,748.

It is an object of this invention to provide a method and apparatus for receiving a data signal modulated by means of a DSB-QC modulation technique and wherein the detrimental effects of the asymmetry of the amplitude-frequency response curve of the transmission channel are compensated.

SUMMARY OF THE INVENTION

Generally, the invention provides a method and apparatus wherein the received signal is sampled at a rate of $1/\tau$ which is a multiple of the signaling rate, 1/T, and is then filtered so as to cause its components at frequencies $f_1$ and $f_2$ to exhibit substantially equal amplitudes, with no alteration of the phase of the filtered signal components, and wherein the detected data are obtained by processing the filtered signal.

In an embodiment of the invention, the transfer function of the filter is:

$$G(f) = \alpha(1 + 2\beta \cos 2\pi f \tau)$$

where
  $\alpha$ is a coefficient representing the gain of the filter, and
  $\beta$ is a coefficient the value of which is substantially equal to $$\beta = \frac{R - 1}{2 (\cos 2\pi f_1 \tau - R \cos 2\pi f_2 \tau)}$$

where
  $R = A_2/A_1$, and
  $A_1$ and $A_2$ are the respective amplitudes of the received signal components at $f_1$ and $f_2$.

In another embodiment of the invention, the value of the gain $\alpha$ is substantially equal to:

$$\alpha = \frac{K}{R} \cdot \frac{\cos 2\pi f_1 \tau - R \cos 2\pi f_2 \tau}{\cos 2\pi f_1 \tau - \cos 2\pi f_2 \tau}$$

where
  K is a constant representing the desired amplitude of the filtered signal components at $f_1$ and $f_2$.

In still another embodiment of the invention, the value of $\beta$ is derived from the synchronizing signal that precedes the data signal.

In yet another embodiment, the coefficient $\beta$ and/or the gain $\alpha$ are continually adjusted while the data signal is being received.

BRIEF DESCRIPTION OF THE DRAWINGS

The present invention will further be described in the following portions of this specification when taken in conjunction with the attached drawings in which like reference characters identify identical apparatus and in which.

DETAILED DESCRIPTION

Figure 2:
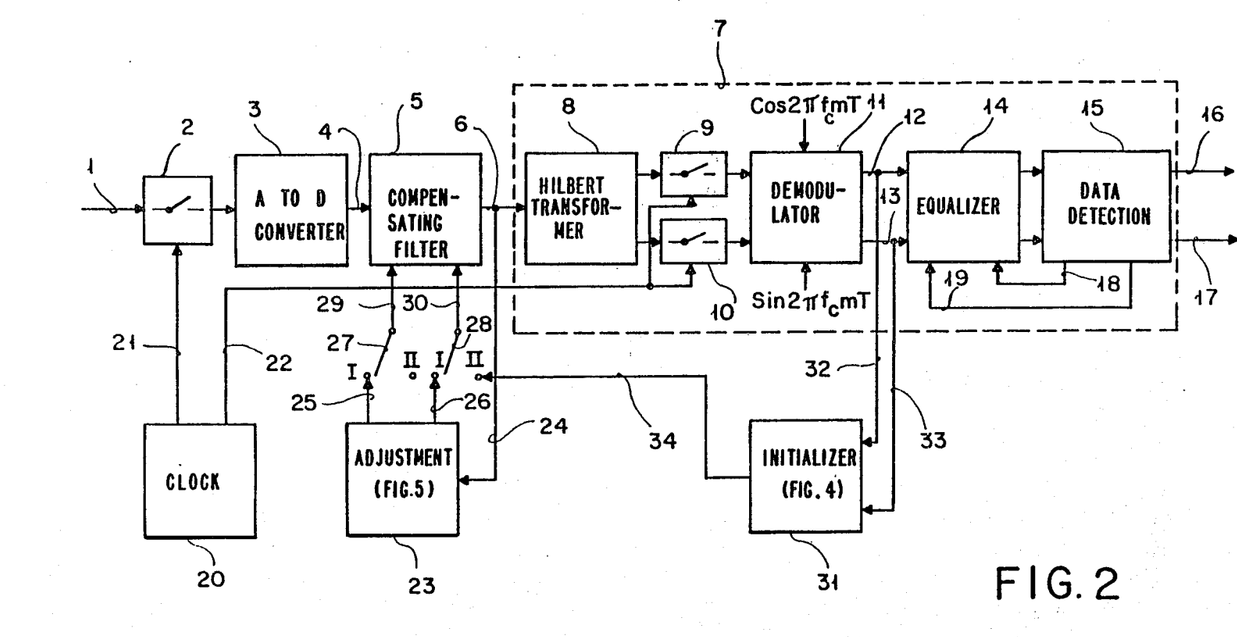
FIG. 2 is a simplified diagram of a DSB-QC receiver in accordance with the invention.

Referring now to FIG. 2, a block diagram of a 9600 bps, DSB-QC receiver in accordance with CCITT Recommendation V29 and incorporating the invention is shown. The signal received from the transmission channel and the energy of which has been normalized by an AGC circuit (not shown), is passed through a band-pass filter (not shown), which rejects all out-of-band noise, and applied via a line 1 to a sampling device 2 in which it is sampled at the rate of $1/\tau$. This rate is chosen equal to a multiple $M/T$ of the signaling rate $1/T$ so as to provide a sufficient number of samples at the output of device 2 to properly define the received signal. The value of the amplitude of these samples is converted to digital form in an analog-to-digital converter (ADC) 3 and applied via a line 4 to a compensating filter 5 to be described later with reference to FIG. 3. The output from the compensating filter 5 is applied via a line 6 to a processing system 7 which derives therefrom the in-phase and quadrature components of the detected data symbols. In processing system 7, line 6 is connected to the input of a digital Hilbert transformer 8.

A Hilbert transformer is a known device which provides at its two outputs the in-phase and quadrature components, respectively, of a signal applied to its input. An exemplary digital implementation of such a device is described in an article entitled "Theory and Implementation of the Discrete Hilbert Transform", by L. R. Rabiner and C. M. Rader, in Digital Signal Processing, IEEE Press, 1972.

The in-phase and quadrature components supplied by Hilbert transformer 8 are respectively re-sampled at the signaling rate $1/T$ by a couple of sampling devices 9 and 10, whose outputs are applied to a complex demodulator 11 which receives from a local source (not shown) an in-phase carrier of the form $\cos 2\pi f_c mT$ and a quadrature carrier of the form $\sin 2\pi f_c mT$, where $f_c$ is the carrier frequency and m is a positive integer whose value ranges from zero to infinity. If the signal applied to demodulator 11 at signaling instant mT is designated r(mT), and its in-phase and quadrature components are respectively designated Re r(mT) and Im r(mT), then the in-phase and quadrature components, Re y(mT) and Im y(mT), of the demodulated signal, y(mT), will be obtained at the respective outputs of demodulator 11, in accordance with the well-know relations:

$$Re\ y(mT) = [Re\ r(mt)] \cos 2\pi f_c mT + [Im\ r(mt))] \sin 2\pi f_c mT \quad (1)$$

$$Im\ y(mT) = -[Re\ r(mt)] \sin 2\pi f_c mT + [Im\ r(mt))] \cos 2\pi f_c mT \quad (2)$$

The in-phase and quadrature components of the demodulated signal are respectively applied via lines 12 and 13 to an adaptive complex equalizer, an exemplary embodiment of which is described in U.S. Pat. No. 3,947,768. The in-phase and quadrature components of the equalized signal are in turn applied to a data detection system 15, which provides on output lines 16 and 17 the in-phase and quadrature components of the detected data symbols, respectively, and on output lines 18 and 19 the in-phase and quadrature components of an error signal representative of the difference between the components of the equalized signal and those of the detected data symbol corresponding thereto. An exemplary embodiment of a data detection system is described in U.S. Pat. No. 4,024,342. Lines 18 and 19 are connected to equalizer 14.

A clock 20, which is synchronized with the received signal and can be of any known type, such as that described in U.S. Pat. No. 4,039,748, is used in a conventional manner to control the sampling device 2 via a line 21, the sampling devices 9 and 10 via a line 22, and the other components of the receiver via lines not shown.

A device 23 which permits adjusting the coefficients of compensating filter 5, has its input connected to the output of filter 5 via a line 24, and has its two outputs respectively connected via lines 25 and 26 to one of the poles, designated I, of two switches 27 and 28. The device 23 will be described in more detail in connection with FIG. 5. The common outputs of switches 27 and 28 are respectively connected via lines 29 and 30 to compensating filter 5.

An initializer 31, which serves to determine the initial value of the coefficients of compensating filter 5, has its two inputs respectively connected via lines 32 and 33 to lines 12 and 13, and its output is connected via a line 34 to the other pole, labeled II, of switch 28. Initializer 31 will be described in greater detail with reference to FIG. 4. The other pole, labeled II, of switch 27 is not connected.

The processing system 7 may consist of any known system and will not be described in greater detail herein. A detailed description thereof will be found in previously mentioned U.S. Pat. No. 4,227,152.

Compensating filter 5 is a digital filter which has the following three characteristics:

- it is sampled at a faster rate than the signaling rate $1/T$;
- it creates no alteration of the phase of the components of the input signal applied thereto; and
- its transfer function is such that the components at the Nyquist frequencies, $f_1$ and $f_2$, of the filtered signal spectrum have substantially equal amplitudes.

Figure 3:
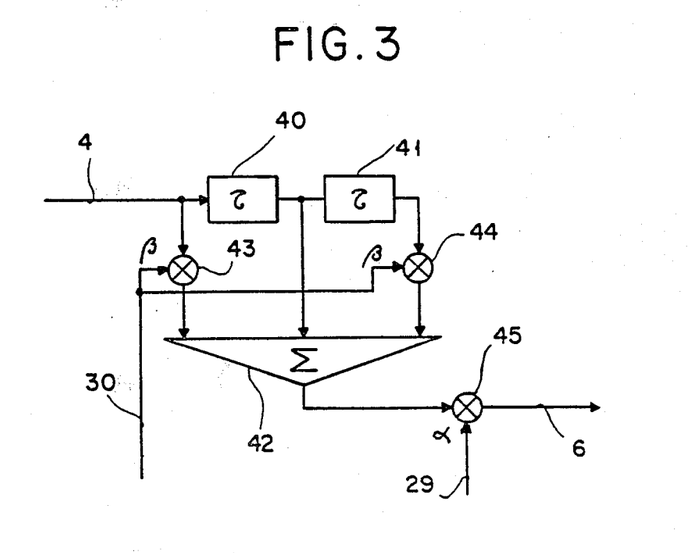
FIG. 3 illustrates an embodiment of the compensating filter 5 of FIG. 2.

Referring now to FIG. 3, a preferred embodiment of compensating filter 5 is shown. This is a symmetrical transversal filter that comprises a 3-tap delay line consisting of two delay elements 40 and 41, each of which introduces a delay equal to the sampling period $\tau$ of the signal applied to the input of the filter, and a summing device 42. The output from ADC 3 (FIG. 2) is applied via line 4 to the input of delay element 40, where the first tap is located. The signals at the first tap and at the third tap, located at the output of delay element 41, are multiplied by a coefficient $\beta$ in two multipliers 43 and 44 which receive the value of $\beta$ via line 30. The outputs from multipliers 43 and 44 and the signal at the second tap, located at the common node between delay elements 40 and 41, are added together in summing device 42. The output from summing device 42 is applied to an input of a multiplier 45, the other input of which receives the value of a coefficient $\alpha$ via line 29 and the output from which is applied to the input of Hilbert transformer 8 via line 6.

It will be understood by those skilled in the art that the multiplication of the output signal from summing device 42 by coefficient $\alpha$, which is a gain coefficient, does not affect the filtering function of filter 5. The provision of gain $\alpha$ constitutes an improvement of filter 5, as shall be seen later. In the following description of filter 5, no account will be taken of either multiplier 45 or gain $\alpha$.

The impulse response of the filter shown in FIG. 3 (not including multiplier 45) is written as $$G(Z) = \beta Z + 1 + \beta Z^{-1} \quad (3)$$

with $Z = \exp j2\pi f\tau$, and $$j = \sqrt{-1}$$

The transfer function G(f) corresponding to impulse response G(Z) is written as $$G(f) = 1 + 2\beta \cos 2\pi f\tau \quad (4)$$

In order for the components at $f_1$ and $f_2$ of the filtered signal spectrum to have a constant amplitude, it is necessary that $$A_1 G(f_1) = A_2 G(f_2) \quad (5)$$

where $A_1$ and $A_2$ are the respective amplitudes of the components at $f_1$ and $f_2$ of the received signal spectrum.

By putting $R = A_2/A_1$, we can write expression (5) as $$G(f_1) = R\, G(f_2) \quad (6)$$

In accordance with (4), we then get $$1 + 2\beta \cos 2\pi f_1\tau = R(1 + 2\beta \cos 2\pi f_2\tau) \quad (7)$$

From (5), we derive the value of coefficient $\beta$ $$\beta = \frac{R - 1}{2(\cos 2\pi f_1 \tau - R \cos 2\pi f_2 \tau)} \quad (8)$$

As used without multiplier 45, and assuming that the value of coefficient $\beta$ is substantially equal to that given by relation (8), the compensating filter 5 shown in FIG. 3 supplies an output signal both of whose spectrum components at $f_1$ and $f_2$ have the same amplitude. In a preferred embodiment of the invention, the output from summing device 42 is multiplied by a coefficient $\alpha$ such that the amplitude of the components at $f_1$ and $f_2$ is equal to a given constant K. This makes it possible to monitor the value of said amplitude and consequently to ensure optimal operation of system components located upstream of the receiver.

Accordingly, the impulse response G(Z) and the transfer function (G(f) of the compensating filter 5 shown in FIG. 3 are $$G(Z) = \alpha(\beta Z + 1 + \beta Z^{-1}) \quad (9)$$

$$G(f) = \alpha(1 + 2\beta \cos 2\pi f\tau) \quad (10)$$

The value of $\beta$ remains as defined by relation (8).

The value of $\alpha$ is obtained by putting $$\alpha G(f_1) = \alpha R G(f_2) = K \quad (11)$$

According to (4), we have $$\alpha(1 + 2\beta \cos 2\pi f_1\tau) = K \quad (12)$$

Substituting the value of $\beta$, as defined in (8), into (12) gives $$\alpha \left[ 1 + (R - 1)\frac{\cos 2\pi f_1\tau}{\cos 2\pi f_1\tau - R \cos 2\pi f_2\tau} \right] = K \quad (13)$$

Hence $$\alpha = \frac{K}{R} \cdot \frac{\cos 2\pi f_1 \tau\, R \cos 2\pi f_2 \tau}{\cos 2\pi f_1 \tau - \cos 2\pi f_2 \tau} \quad (14)$$

As has just been stated, in order for compensating filter 5 to perform the desired filtering function, the value of coefficient $\beta$ must be substantially equal to that given by relation (8). This latter value is dependent upon R, that is, upon the ratio of the component at $f_1$ to the component at $f_2$ of the received signal spectrum. A first approach is to provide a storage means for storing several previously calculated values of $\beta$ and to choose the most suitable one in accordance with the measured value of R. This approach is a simple compromise which may yield satisfactory results where the characteristics of the transmission channels are fairly precisely known and vary but little in time. A second approach, which is the one used in the preferred embodiment of the invention, is to derive the value of $\beta$ from the synchronizing signal that precedes the data signal and is received during the receiver turn-on time. In accordance with CCITT Recommendation V29, the transmission of the data signal can be preceded by the transmission of a synchronizing signal the second segment of which is comprised of successive alternations between two predetermined symbols. For more details on Recommendation V29, reference should be made to the Yellow Book, Vol. 8, Fascicle 8-1, pages 165–167, published by the CCITT, Geneva, 1980.

The above synchronizing signal has a frequency spectrum comprised of three components at frequencies $f_c$, $f_1$ and $f_2$. The synchronizing signal obtained at the receiver can be put in the form $$x(t) = A_1 \exp j(2\pi f_1 t + \phi_1) + A_c \exp j(2\pi f_c t + \phi_c) + A_2 \exp j(2\pi f_2 t + \phi_2) \quad (15)$$

where $A_1$, $A_c$ and $A_2$ are the respective amplitudes of the components at $f_1$, $f_c$ and $f_2$ of the received synchronizing signal, $\phi_1$, $\phi_c$ et $\phi_2$ are the respective phases of the components at $f_1$, $f_c$ and $f_2$ of the received synchronising signal, and
$j = \sqrt{-1}$.

Since $f_1 = f_c - 1/2T$ and $f_2 = f_c + 1/2T$, signal x(t) can be written in the form $$x(t) = A_1 \exp j\left[2\pi\left(f_c - \frac{1}{2T}\right)t + \phi_1\right] + \quad (16)$$

$$A_c \exp j(2\pi f_c t + \phi_c) + A_2 \exp j\left[2\pi\left(f_c + \frac{1}{2T}\right)t + \phi_2\right]$$

After a complex demodulation has been performed using a carrier at frequency $f_c$, the received synchronizing signal can be written as $$y(t) = A_1 \exp j\left(\phi_1 - \frac{\pi t}{T}\right) + \quad (17)$$

$$A_c \exp j\phi_c + A_2 \exp j\left(\phi_2 + \frac{\pi t}{T}\right)$$

The signal y(t) sampled at a rate of 1/T can be put in the form $$y(nT) = A_1 \exp j(\phi_1 - n\pi) + A_c \exp j\phi_c + A_2 \exp j(\phi_2 + n\pi) \quad (18)$$

It is clear from (17) that $$y(nT) - y[(n+1)T] = 2(-1)^n(A_1 \exp j\phi_1 + A_2 \exp j\phi_2) \quad (19)$$

If signal y(t) is sampled at nT T/2, we get, in accordance with (17)

$$y(nT + T/2) = (-1)^n(-j)A_1 \exp j\phi_1 + A_c \exp j\phi_c + (-1)^n j A_2 \exp j\phi_2 \quad (20)$$

In accordance with (20), we have $$y(nT + T/2) - y[(n+1)T + T/2] = 2j(-1)^n(A_2 \exp j\phi_2 - A_1 \exp j\phi_1) \quad (21)$$

Putting
$$\Delta(nT) = y(nT) - y[(n+1)T] \quad (22)$$

we get $$\Delta(nT + T/2) = y(nT + T/2) - y[(n+1)T + T/2] \quad (23)$$

Combining (19) and (21), we get:

$$\Delta_1 = \Delta(nT) + j\Delta(nT + T/2) = 4(-1)^n A_1 \exp j\phi_1 \quad (24)$$

$$\Delta_2 = \Delta(nT) - j\Delta(nT + T/2) = 4(-1)^n A_2 \exp j\phi_2 \quad (25)$$

Thus, the components at $f_1$ and $f_2$ of the received synchronizing signal have been separated. A Cartesian-to-polar coordinate conversion is now performed to determine the values of $A_1$ and $A_2$, hence the value of R which will permit calculating the suitable value of coefficient $\beta$ of compensating filter 5.

Figure 4:
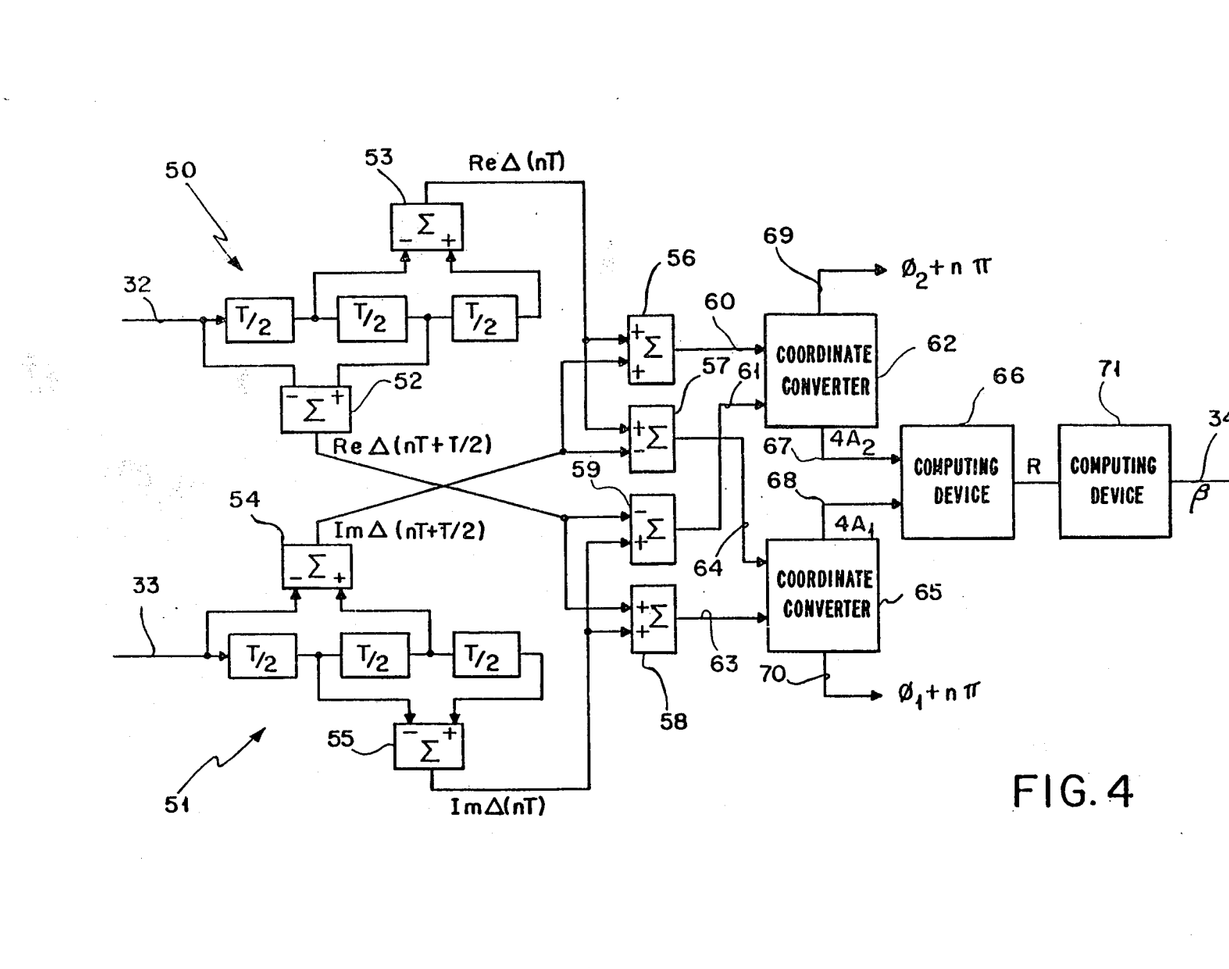
FIG. 4 shows an embodiment of the initializer 31 of FIG. 2.

Referring now to FIG. 4, there is shown an embodiment of initializer 31, which serves to determine the value of coefficient $\beta$ using relations (24), (25) and (8).

The outputs from demodulator 11 (FIG. 2) are respectively applied via lines 32 and 33 to the inputs of a pair of four-tap delay lines 50 and 51 each of which is comprised of three delay elements each introducing a T/2-second delay. The first tap of delay line 50, which is located at the input thereof, is connected to the (−) input of a subtractor 52, which has its (+) input connected to the third tap of delay line 50, while the second tap is connected to the (−) input of a subtractor 53 which has its (+) input connected to the fourth tap. The first tap of delay line 51, which is located at the input thereof, is connected to the (−) input of a subtractor 54 which has its (+) input connected to the third tap of delay line 51, while the second tap is connected to the (−) input of a subtractor 55 which has its (+) input connected to the fourth tap of delay line 51. The output of subtractor 53 is connected to one of the inputs of an adder 56 and to the (+) input of a subtractor 57. The output of subtractor 54 is connected to the other input of adder 56 and to the (−) input of subtractor 57. The output of subtractor 52 is connected to one of the inputs of an adder 58 and to the (−) input of a subtractor 59. The output of subtractor 55 is connected to the other input of adder 58 and to the (+) input of subtractor 59. The outputs of adder 56 and subtractor 59 are respectively connected via lines 60 and 61 to the inputs of a conventional Cartesian-to-polar coordinate converter 62. The outputs of adder 58 and subtractor 57 are respectively connected to the inputs of a Cartesian-to-polar coordinate converter 65. A first output of each of said converters is connected to a first computing device 66 via lines 67 and 68, respectively. Converters 62 and 65 have a second output which is connected to lines 69 and 70, respectively. The output of computing device 66 is connected to the input of a second computing device 71 whose output is connected to pole II of switch 28 via line 34 (FIG. 2).

Before describing the operation of the device of FIG. 4, it is thought desirable to briefly reiterate the principles thereof. In the receiver shown in FIG. 2, downstream of the Hilbert transformer, the received signal and all signals derived therefrom are complex signals defined by their in-phase and quadrature components respectively designated Re and Im. Thus, signals y(nT), y[(n+1)T], y(nT+T/2) and y[(n+1)T+T/2] can be written as $$y(nT) = \text{Re } y(nT) + j \text{ Im } y(nT) \quad (26)$$

$$y[(n+1)T] = \text{Re } y[(n+1)T] + j \text{ Im } y[(n+1)T] \quad (27)$$

$$y(nT+T/2) = \text{Re } y(nT+T/2) + j \text{ Im } y(nT+T/2) \quad (28)$$

$$y[(n+1)T+T/2] = \text{Re } y[(n+1)T+T/2] + j \text{ Im } y[(n+1)T+T/2] \quad (29)$$

In accordance with relations (22) and (23), we arrive at $$\text{Re}\Delta(nT) = \text{Re } y(nT) - \text{Re } y[(n+1)T] \quad (30)$$

$$\text{Im}\Delta(nT) = \text{Im } y(nT) - \text{Im } y[(n+1)T] \quad (31)$$

$$\text{Re}\Delta(nT+T/2) = \text{Re } y(nT+T/2) - \text{Re } y[(n+1)T+T/2] \quad (32)$$

$$\text{Im}\Delta(nT+T/2) = \text{Im } y(nT+T/2) - \text{Im } y[(n+1)T+T/2] \quad (33)$$

In accordance with relations (24) and (25), we get $$Re\Delta_1 = Re\Delta(nT) - Im\Delta(nT + T/2) \qquad (34)$$

$$Im\Delta_1 = Im\Delta(nT) + Re\Delta(nT + T/2) \qquad (35)$$

$$Re\Delta_2 = Re\Delta(nT) + Im\Delta(nT + T/2) \qquad (36)$$

$$Im\Delta_2 = Im\Delta(nT) - Re\Delta(nT + T/2) \qquad (37)$$

Referring now to FIGS. 2 and 4, during the turn-on time of the receiver, switches 27 and 28 are set to position II and sampling devices 9 and 10 sample the outputs from Hilbert transformer 8 at a rate of 2/T under control of the clock 20. Demodulator 11 provides simultaneously on lines 32 and 33 the samples of the in-phase and quadrature components of the received synchronizing signal demodulated at the rate of 2/T. If the sample available at a given sampling instant at the fourth tap of delay line 50 is designated as Re y(nT), then the samples Re y(nT+T/2), Re y[(n+1)T] and Re y[(n+1)T+T/2], will respectively be obtained at the third, second and first taps thereof. At this same sampling instant, the samples Im y(nT), Im y(nT+T/2), Im y[(n+1)T] and Im y[(n+1)T+T/2], will respectively be available at the fourth, third, second and first taps of delay line 51. The quantities Re $\Delta$(nT), Im $\Delta$(nT), Re $\Delta$(nT+T/2) and Im $\Delta$(nT+T/2) will then be obtained at the outputs of subtractors 53, 55, 52 and 54, respectively, in accordance with relations (30) to (33). These last four quantities are combined in devices 56 to 59, and the quantities Re $\Delta_1$, Im $\Delta_1$, Re $\Delta_2$ and Im $\Delta_2$ are respectively obtained on lines 64, 63, 60 and 61, in accordance with relations (34) to (36). Quantities Re $\Delta_1$ and Im $\Delta_1$, are applied to coordinates converter 65 which derives therefrom quantities $4A_1$ and $(\phi_1 + n\pi)$ which are representative of the amplitude and the phase, respectively, of the component at $f_1$ of the received synchronizing signal. Quantities Re $\Delta_2$ and Im $\Delta_2$ are applied to coordinates converter 62 which derives therefrom quantities $4A_2$ and $(\phi_2 + n\pi)$ representative of the amplitude and the phase, respectively, of the component at $f_2$ of said signal. Quantities $(\phi_1 + n\pi)$ and $(\phi_2 + n\pi)$ are respectively available on lines 70 and 69 to be used by the receiver for clock synchronization or other purposes. Quantities $4A_1$ and $4A_2$ are respectively applied via lines 68 and 67 to computing device 66 which derives therefrom the value of the amplitude ratio R. The value of R is applied to computing device 71 which derives therefrom the value of coefficient $\beta$ in accordance with relation (8). The value of coefficient $\beta$ is applied to compensating filter 5 via line 34, switch 28 and line 30.

Figure 5:
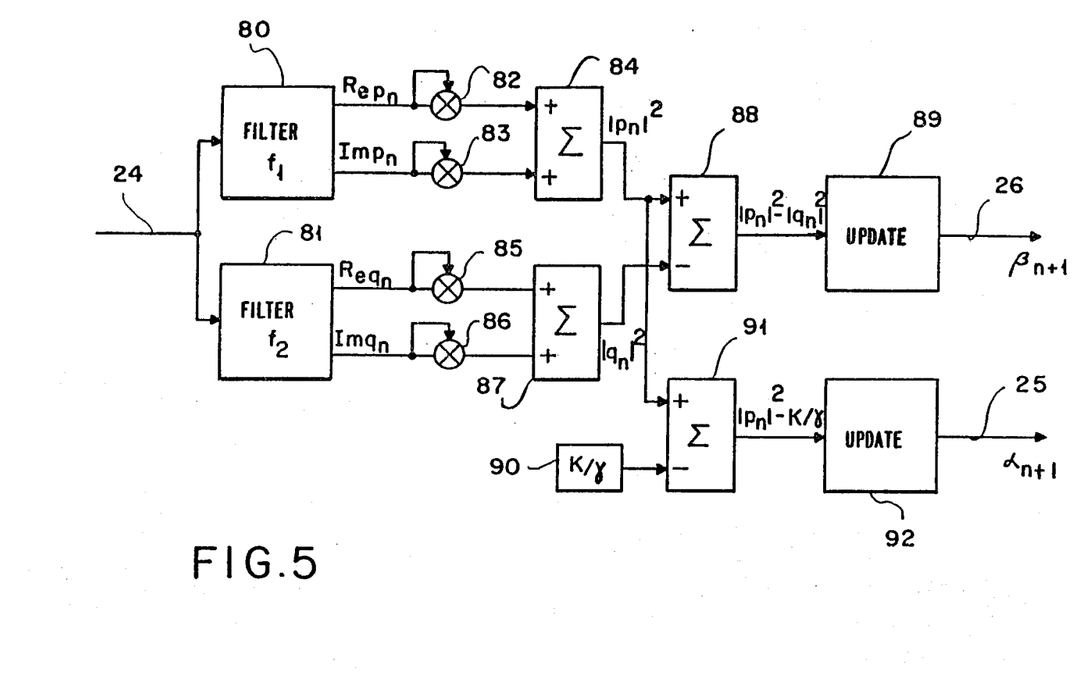
FIG. 5 shows an embodiment of the adjusting device 23 of FIG. 2.

A description will now be given of adjusting device 23 which is used for continually adjusting the coefficients of compensating filter 5 during transmission of a data signal. The use of such a device may be found desirable when the amplitude-frequency response of the transmission channel varies in time. The transfer function of compensating filter 5 is given in its more general form by relation (10), which is repeated below for convenience $$G(f) = \alpha(1 + 2\beta \cos 2\pi f \tau) \qquad (10)$$

(It should be noted, that, with $\alpha = 1$, relation (10) is identical to relation (4). In order for the amplitude of the components at $f_1$ and $f_2$ of the output signal provided by the compensating filter to be equal to a given value K, it is necessary that $$|H(f_1)|^2 \cdot |G(f_1)|^2 = |H(f_2)|^2 \cdot |G(f_2)|^2 = K \qquad (38)$$

where H(f) is the spectrum of the input signal applied to the filter.

To this end, the value of coefficient $\beta$ must be adjusted so as to minimize the quantity
$$Q = [|H(f_1)|^2 \cdot |G(f_1)|^2 - |H(f_2)|^2 \cdot |G(f_2)|^2]^2 \qquad (39)$$

The value of coefficient $\beta$ can be adjusted by using the gradient method defined as $$\beta_{n+1} = \beta_n - \lambda_1 \frac{\partial Q}{\partial \beta}, \quad \lambda_1 > 0 \qquad (40)$$

Relation (40) can be approximated by
$$\beta_{n+1} = \beta_n - \lambda_1 [|H(f_1)|^2 \cdot |G(f_1)|^2 - |H(f_2)|^2 \cdot |G(f_2)|^2] \qquad (41)$$

In accordance with the invention, relation (41) can be approximated by substituting the difference $|p_n|^2 - |q_n|^2$ for the terms shown between brackets in (41), which gives $$\beta_{n+1} = \beta_n - \lambda_2 [|p_n|^2 - |q_n|^2] \qquad (42)$$

where $p_n$ et $q_n$ are the respective outputs from the two narrow-band filters centered on frequencies $f_1$ and $f_2$, and $\lambda_2$ is an adjustment step parameter.

Similarly, the value of coefficient $\alpha$ is adjusted to minimize the quantity $$P = [|H(f_1)|^2 \cdot |G(f_1)|^2 - K]^2 \qquad (43)$$

The value of $\alpha$ can be adjusted by using the gradient method defined as $$\alpha_{n+1} = \alpha_n - \lambda_3 \frac{\partial P}{\partial \alpha} \qquad (44)$$

Relation (44) can be approximated by
$$\alpha_{n+1} = \alpha_n - \lambda_3 [|H(f_1)|^2 \cdot |G(f_1)|^2 - K] \qquad (45)$$

Using the same approach as in the case of the adjustment of $\delta$, relation (45) can be put in the form $$\alpha_{n+1} = \alpha_n - \lambda_4 [|p_n|^2 - K/\gamma] \qquad (46)$$

where $\lambda_4$ is an adjustment step parameter, and $\gamma$ is the gain of the two narrow-band filters mentioned above.

The parameters $\lambda_2$ and $\lambda_1$ must be chosen so that their values are small with respect to $\gamma/K$.

In the above method, the adjustment of gain $\alpha$ is derived from the component at $f_1$ of the received signal. It will be understood by those skilled in the art that such adjustment could similarly be derived from the component at $f_2$, as briefly discussed below.

The gain $\alpha$ can be adjusted so as to minimize the quantity $$P' = [|H(f_2)|^2 \cdot |G(f_2)|^2 - K]^2 \qquad (43')$$

The gradient method as applied to quantity P' is written in the form $$a_{n+1} = a_n - \lambda_5 \frac{\partial P}{\partial a} \quad (44')$$

Relation (44') can be approximated by $$a_{n+1} = a_n - \lambda_5 [|H(f_2)|^2 \cdot |G(f_2)|^2 - K] \quad (45')$$

Relation (45') can in turn be approximated by $$a_{n+1} = a_n - \lambda_5 [|q_n|^2 - K/\gamma] \quad (46')$$

where
$\lambda_5$ is a positive adjustment step parameter.

Referring now to FIG. 5, an embodiment of the adjustment device 23 of FIG. 2 is shown. This embodiment adjusts the values of coefficients $\alpha$ and $\beta$ in accordance with relations (46) and (42). When a data signal is received by the receiver, switches 27 and 28 (FIG. 2) are set to position I and adjustment device 23 adjusts the values of coefficients $\alpha$ and $\beta$.

The output from compensating filter 5 is applied via line 24 to the input of two narrow-band filters 80 and 81 respectively centered on frequencies $f_1$ and $f_2$. Each of these filters has two outputs at which the in-phase and quadrature components of the filtered signal are respectively available. An exemplary embodiment of such filters is described in U.S. Pat. No. 4,039,748. The in-phase component, Re $p_n$, of the output signal supplied by filter 80 is multipled by itself in a multiplier 82, and the quadrature component, Im $p_n$, of said output signal is multiplied by itself in a multiplier 83. The outputs from multipliers 82 and 83 are then added together in an adder 84 which supplies the quantity $$|p_n|^2 = (Re\ p_n)^2 + (Im\ p_n)^2$$

The in-phase component, Re $q_n$, of the output signal supplied by filter 81 is multiplied by itself in a multiplier 85, and the quadrature component, Im $q_n$, of said output signal is multiplied by itself in a multiplier 86. The outputs from multipliers 85 and 86 are then added together in an adder 87 which supplies the quantity $$|q_n|^2 = (Re\ q_n)^2 + (Im\ q_n)^2$$

The quantity $|q_n|^2$ is subtracted from $|p_n|^2$ in a subtractor 88. The difference $(|p_n|^2 - |q_n|^2)$ is applied to a conventional updating device 89 which provides on line 25 the value $\beta_{n+1}$ derived from the difference $(|p_n|^2 - |q_n|^2)$ in accordance with relation (42). The previously calculated quantity $K/\gamma$, which may be stored in storage means 90, is subtracted from the quantity $|p_n|^2$ in a subtractor 91. The difference thus obtained $(|p_n|^2 - K/\gamma)$ is applied to an updating device similar to device 89 which provides on line 25 the value $a_{n+1}$ derived from the latter difference in accordance with relation (46).

While the invention has been particularly shown and described with reference to a preferred embodiment thereof, it will be understood by those skilled in the art that numerous changes in form and detail may be made therein without departing from the spirit and scope of the invention.

What is claimed is:

1. A method of receiving a data signal sent over a transmission channel by modulating a carrier by means of a DSB-QC modulation technique at a signaling rate of 1/T, comprising the steps of:

sampling the signal received from said transmission channel, at a rate of $1/\tau$ equal to a multiple of said signaling rate, 1/T;

filtering the sampled signal such that the phase thereof is not altered and that the components at frequencies $f_1$ and $f_2$ of the filtered signal are substantially equal, with said frequencies $f_1$ and $f_2$ being defined as $$f_1 = f_c - \frac{1}{2T} \quad f_2 = f_c + \frac{1}{2T}$$

where $f_c$ is the carrier frequency; and processing said filtered signal to derive the detected data therefrom.

2. The method of claim 1, wherein said filtering step is performed in accordance with the following transfer function $$G(f) = \alpha(1 + 2\beta \cos 2\pi f\tau)$$

where
$\alpha$ is a coefficient representing the gain associated with the filtering process, and
$\beta$ is a coefficient whose value is substantially equal to $$\beta = \frac{R - 1}{2(\cos 2\pi f_1 \tau - R \cos 2\pi f_2 \tau)}$$

where
$R = A_2/A_1$, with $A_1$ and $A_2$ being the respective amplitudes of the components at $f_1$ and $f_2$ of said received signal.

3. The method of claim 2, wherein the value of said coefficient $\alpha$ is substantially equal to $$\alpha = \frac{K}{R} \frac{\cos 2\pi f_1 \tau - R \cos 2\pi f_2 \tau}{\cos 2\pi f_1 \tau - \cos 2\pi f_2 \tau}$$

where K is a constant representing the desired amplitudes of the components at $f_1$ and $f_2$ of said filtered signal.

4. The method of claim 2, further including the step of adjusting said coefficient $\alpha$ in accordance with the relation $$\beta_{n+1} = \beta_n - \lambda_1 [|H(f_1)|^2 \cdot |G(f_1)|^2 - |H(f_2)|^2 \cdot |G(f_2)|^2]$$

where
$\lambda_1$ is a positive adjustment step parameter, and
H(f) is the spectrum of said received signal.

5. The method of claim 4, wherein said step of adjusting the coefficient $\beta$ includes the sub-steps of:

passing through a first narrow-band filter the signal resulting from said step of filtering said sampled signal to derive therefrom its component at $f_1$, said component at time nT being designated $P_n$;

passing through a second narrow-band filter said signal resulting from said step of filtering said sampled signal to derive therefrom its component at $f_2$, said component at time nT being designated $g_n$; and adjusting said coefficient $\beta$ in accordance with the relation $$\beta_{n+1} = \beta_n - \lambda_2 [|p_n|^2 - |g_n|^2]$$

$\lambda_2$ is a positive adjustment parameter.

6. The method of claim 2, further including the step of adjusting said coefficient $\alpha$ in accordance with the relation $$a_{n+1}=a_n-\lambda_3[|H(f_1)|^2 \cdot |G(f_1)|^2-K]$$

where
$\lambda_3$ is a positive adjustment step parameter,
H(f) is the received signal spectrum, and
K is a given constant representing the desired amplitude of the component at $f_1$ and $f_2$ of the signal resulting from said sampled signal filtering step.

7. The method of claim 6, wherein said step of adjusting said coefficient $\alpha$ includes the sub-steps of
passing through a narrow-band filter the signal resulting from said step of filtering said sampled signal to derive therefrom its component at $f_1$, said component at time nT being designated $p_n$, and
adjusting said coefficient $\alpha$ in accordance with the relation:

$$a_{n+1}=a_n-\lambda_4[|p_n|^2-K/\gamma]$$

where
$\lambda_4$ is a positive adjustment step parameter, and
$\gamma$ is the gain associated with the process of passing the signal through said narrow-band filter.

8. The method of claim 2, further including the step of adjusting said coefficient $\alpha$ in accordance with the relation $$a_{n+1}=a_n-\lambda_5[|H(f_2)|^2 \cdot |G(f_2)|^2-K]$$

where
$\lambda_5$ is a positive adjustment step parameter,
H(f) is the received signal spectrum, and
K is a given constant representing the desired amplitude of the components at $f_1$ and $f_2$ of the signal resulting from said sampled signal filtering step.

9. The method of claim 2, wherein said coefficient $\alpha$ is equal to 1.

10. The method of claim 2 for use in a system wherein the data signal is preceded by a synchronizing signal whose spectrum includes components at $f_c$, $f_1$ and $f_2$, further including the steps of:
demodulating said filtered signal by means of a local carrier frequency equal to $f_c$ at a rate of 2/T;
storing the samples of the demodulated signal;
determining the signals $$\Delta(nT)=y(nT)-y[(n+1)T]$$

$$\Delta(nT+T/2)=y(nT+T/2)-y[(n+1)T+T/2]$$

where y(nT) represents the demodulated signal at time nT,
determining the signal $$\Delta_1=\Delta(nT)+j\,\Delta(nT+T/2)$$

$$\Delta_2=\Delta(nT)-j\,\Delta(nT+T/2)$$

determining the amplitude of signals $\Delta_1$ and $\Delta_2$;
calculating the ratio, R, of the amplitude of signal $\Delta_1$ to that of signal $\Delta_2$; and
determining coefficient $\beta$ in accordance with the relation given in claim 2.

11. Apparatus for receiving a data signal sent over a transmission channel by modulating a carrier by means of a DSB-QC modulation technique at a signaling rate of 1/T, comprising:
means for sampling the signal received from said transmission channel at a rate of $1/\tau$ equal to a multiple of said signaling rate, 1/T;
filter means for filtering the received signal such that the phase thereof is not altered and that the components at frequencies $f_1$ and $f_2$ of the filtered signal are substantially equal, with frequencies $f_1$ and $f_2$ being defined as $$f_1 = f_c - \frac{1}{2T} \quad f_2 = f_c + \frac{1}{2T}$$

where $f_c$ is the carrier frequency; and
means for processing said filtered signal to derive the detected data therefrom.

12. Apparatus according to claim 11, wherein said filter means has the following transfer function:

$$G(f)=\alpha(1+2\beta\cos 2\pi f/\tau)$$

where
$\alpha$ is a coefficient representing the gain associated with said filter means, and
$\beta$ is a coefficient whose value is substantially equal to $$\beta = \frac{R-1}{2(\cos 2\pi f_1\tau - R\cos 2\pi f_2\tau)}$$

where $R=A_2/A_1$, with $A_1$ and $A_2$ being the respective amplitudes of the components at $f_1$ and $f_2$ of said received signal.

13. Apparatus according to claim 12, wherein the value of said coefficient $\alpha$ is substantially equal to $$\alpha = \frac{K}{R}\,\frac{\cos 2\pi f_1\tau - R\cos 2\pi f_2\tau}{\cos 2\pi f_1\tau - \cos 2\pi f_2\tau}$$

where K is a constant representing the desired amplitude of the components at $f_1$ and $f_2$ of said filtered signal.

14. Apparatus according to claim 12, further including means for adjusting said coefficient $\beta$ in accordance with the relation:

$$\beta_{n+1}=\beta_n-\lambda_1[|H(f_1)|^2\cdot|G(f_1)|^2-|H(f_2)|^2\cdot|G(f_2)|^2]$$

where
$\lambda_1$ is a positive adjustment step parameter, and
H(f) is the spectrum of said received signal.

15. Apparatus according to claim 14, wherein said means for adjusting said coefficient $\beta$ includes:
first narrow-band filter means for deriving the component at $f_1$ of the signal provided by said filter means, the output from said first narrow-band filter means being designated $p_n$;
second narrow-band filter means for deriving the component at $f_2$ of the signal provided by said filter means, the output from said second narrow-band filter means being designated $q_n$;
means for determining the quantity $|p_n|^2-|q_n|^2$; and
means for adjusting said coefficient $\beta$ in accordance with the relation:

$$\beta_{n+1}=\beta_n-\lambda_2[|p_n|^2-|q_n|^2]$$

where $\lambda_2$ is a positive adjustment step parameter.

16. Apparatus according to claim 12, comprising means for adjusting said coefficient $\alpha$ in accordance with the relation $$\alpha_{n+1} = \alpha_n - \lambda_3 [|H(f_1)|^2 \cdot |G(f_1)|^2 - K]$$

where
$\lambda_3$ is a positive adjustment step parameter,
H(f) is the received signal spectrum, and
K is a given constant representing the desired amplitude of the components at $f_1$ and $f_2$ of the signal supplied by said filter means.

17. Apparatus according to claim 16, wherein said means for adjusting said coefficient $\alpha$ includes:
narrow-band filter means for deriving the component at $f_1$ of the signal provided by said filter means, the output from said narrow-band filter means being designated $p_n$;
means for determining the quantity $|p_n|^2 - K/\gamma$, where $\gamma$ is the gain of said narrow-band filter means; and
adjusting means for adjusting said coefficient $\alpha$ in accordance with the relation $$\alpha_{n+1} = \alpha_n - \lambda_4 [|p_n|^2 - K/\gamma]$$

where $\lambda_4$ is a positive adjustment gain parameter.

18. Apparatus according to claim 12, comprising means for adjusting said coefficient $\alpha$ in accordance with the relation $$\alpha_{n+1} = \alpha_n - \lambda_5 [|H(f_2)|^2 \cdot |G(f_1)|^2 - K]$$

where $\lambda_5$ is a positive adjustment parameter,
H(f) is the received signal spectrum, and
K is a given constant representing the desired amplitude of the component at $f_1$ and $f_2$ of the signal supplied by said filter means.

19. Apparatus according to claim 12, as used in a system wherein the data signal is preceded by a synchronizing signal whose spectrum includes components at $f_c$, $f_1$ and $f_2$, further including:
means for demodulating the signal provided by said filter means, using a local carrier frequency equal to $f_c$ at a rate of 2/T;
means for storing samples of the demodulated signal;
means for determining the signal $$\Delta(nT) = y(nT) - y[(n+1)T]$$

where y(nT) represents the demodulated signal at time nT,
means (52, 54) for determining the signal:

$$\Delta(n+1) = y(nT + T/2) - y[(n+1)T + T/2]$$

means for determining the signal:

$$\Delta_1 = \Delta(nT) + j\Delta(nT + T/2)$$

means for determining the signal:

$$\Delta_2 = \Delta(nT) - j\Delta(nT + T/2)$$

means for determining the amplitude of signal $\Delta_1$ and $\Delta_2$;
means for determining the ratio, R, of the amplitude of signal $\Delta_1$ to that of signal $\Delta_2$; and
means for determining the value of said coefficient $\beta$ in accordance with the relation given in claim 12.

* * * * *